Sept. 29, 1970   A. OLFF ET AL   3,531,626
ELECTRICAL DEVICE FOR VISUALLY CHECKING CREDIT CARDS
Filed May 29, 1967   4 Sheets-Sheet 1

INVENTORS
Anthony Olff
and John Lapi
by A. Lee Helms

ATTORNEY.

INVENTORS
Anthony Olff
and John Lapi
by
H. Lee Helms
ATTORNEY.

INVENTORS
Anthony Olff
and John Lapi
by
H. Lee Helms
ATTORNEY.

United States Patent Office 3,531,626
Patented Sept. 29, 1970

3,531,626
ELECTRICAL DEVICE FOR VISUALLY CHECKING CREDIT CARDS
Anthony Olff, 1490 Pacific St., Brooklyn, N.Y. 11213, and John Lapi, 5 Nagle Lane, Commack, N.Y. 11725
Filed May 29, 1967, Ser. No. 641,789
Int. Cl. G06k 5/00; H01h 43/08
U.S. Cl. 235—61.11
7 Claims

ABSTRACT OF THE DISCLOSURE

The invention is adapted to reduce the fraudulent use of lost or counterfeited credit cards, by use of apertured, i.e. punched, cards, each placed in the respective card to identify the holder. In use at a retail outlet of goods, the clerk places the card in a compartment and slides it forwardly. As the card is thus moved the holes will each come into register with contact closing movable elements such as metal balls, and the filaments of at least two electrical lamps will be illuminated by the circuit-closing action of said movable elements, as for example, one lamp in accordance with a code marking printed on the card, and a second lamp in accordance with a second code designation which may be one required to be memorized by the card holder. The invention enables use of multi-filament electric lamps, each filament representing a special code designation.

The device of this invention is for the purpose of reducing the fraudulent use of credit cards which have been lost by the owner or stolen or counterfeited. It embodies an electromechanical system, which effects the decoding and visual electrical display on a panel of two coordinates of a credit card and which represent an alpha letter and numerical code. The card used in this device may be approximately the same size as existing cards. The top of the card will contain the basic information previously used, and the bottom of the card may be blank. The card will contain two apertures appearing apparently at random, but which will be in predetermined positions. The information from the old card will be transferred by the store to the top of the new card. The holes in the card will be used to identify the holder of the card in the following way:

When a person is issued a new card, two alpha letter and numeric codes will be assigned. One will be printed at the top of the card and the other will be given in confidence for memory by the card holder. When a customer presents the card for purchase, he will be required to give the confidential memorized code designation. The clerk will then insert the card forwardly in the device, and, through electrical circuit means leading to lamps on the visual display panel, both code designations will appear by illumination of appropriate lamps. The circuit closing means include ball contacts controlled by the card.

The invention will be described with reference to the accompanying drawings, in which.

Figure 1:
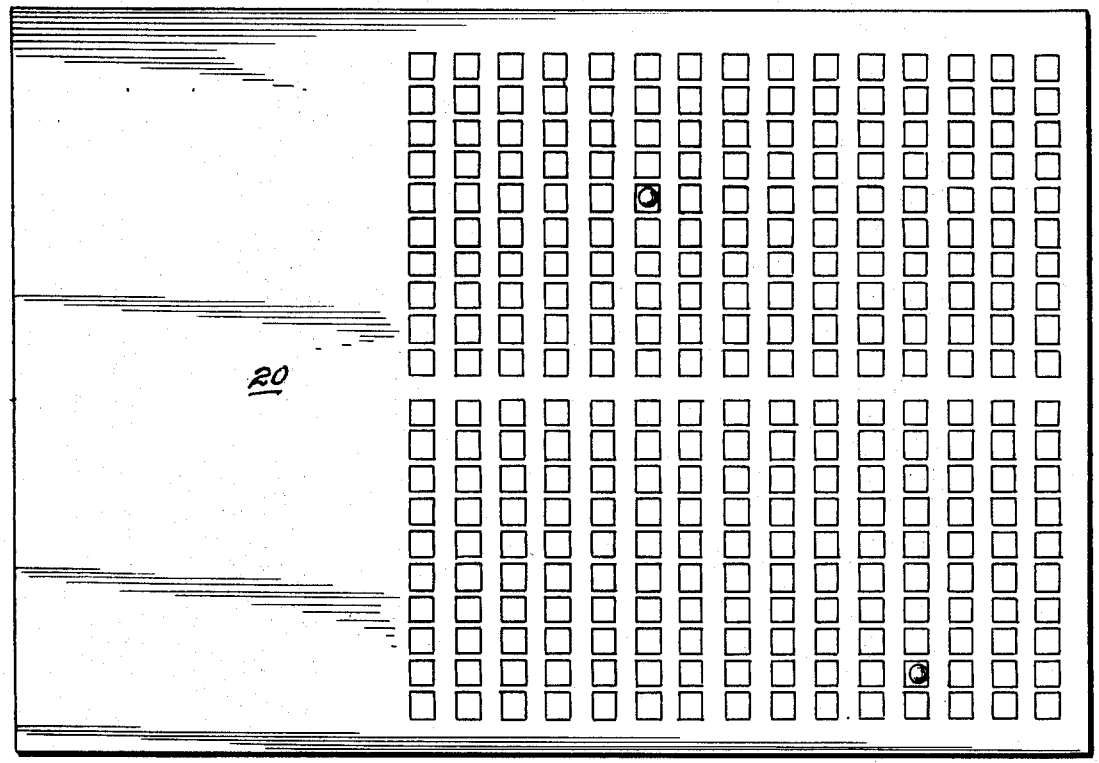
FIG. 1 is a plan view of a suitable credit card, showing that two holes have been punched through the card at selected positions.
Figure 2:
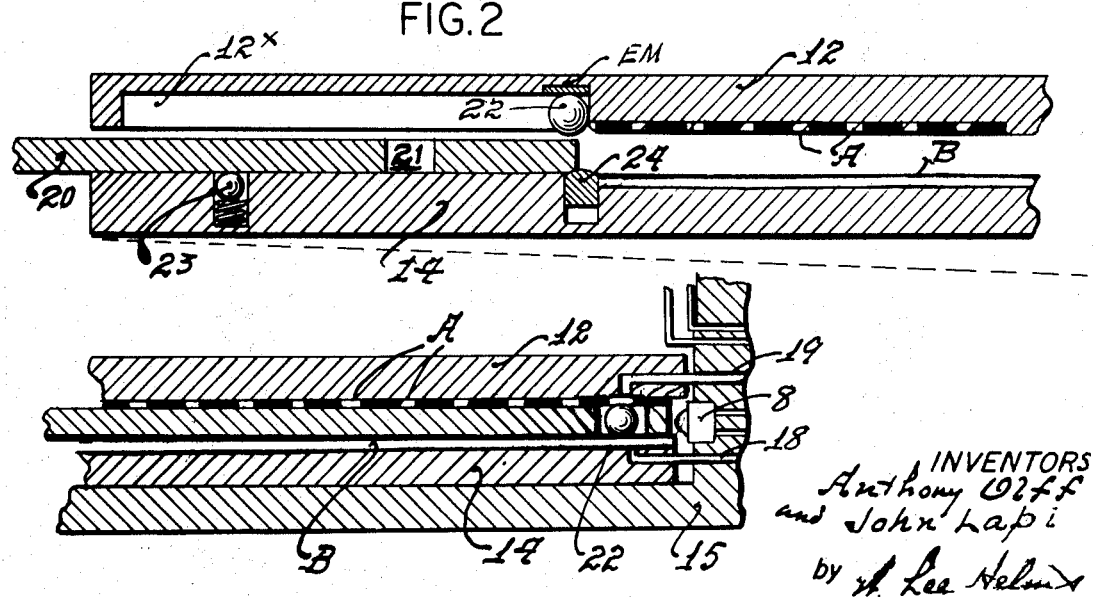
FIG. 2 is a schematic vertical section through a box enclosing two spaced plates between which the card is pushed by the operator, end areas appearing.

Referring to FIG. 1 of the drawings, it will be seen that the card is printed with two groups of designations shown as rectangular, but which may be of any shape which, when punched, will permit passage of a metal ball to contact with printed electrical leads on the underlying plate indicated at 14 in FIG. 2 and with electrical leads on an overlying plate. On the card each group is in rows of designations and two designations each for one group are punched through the card.

Figure 4:
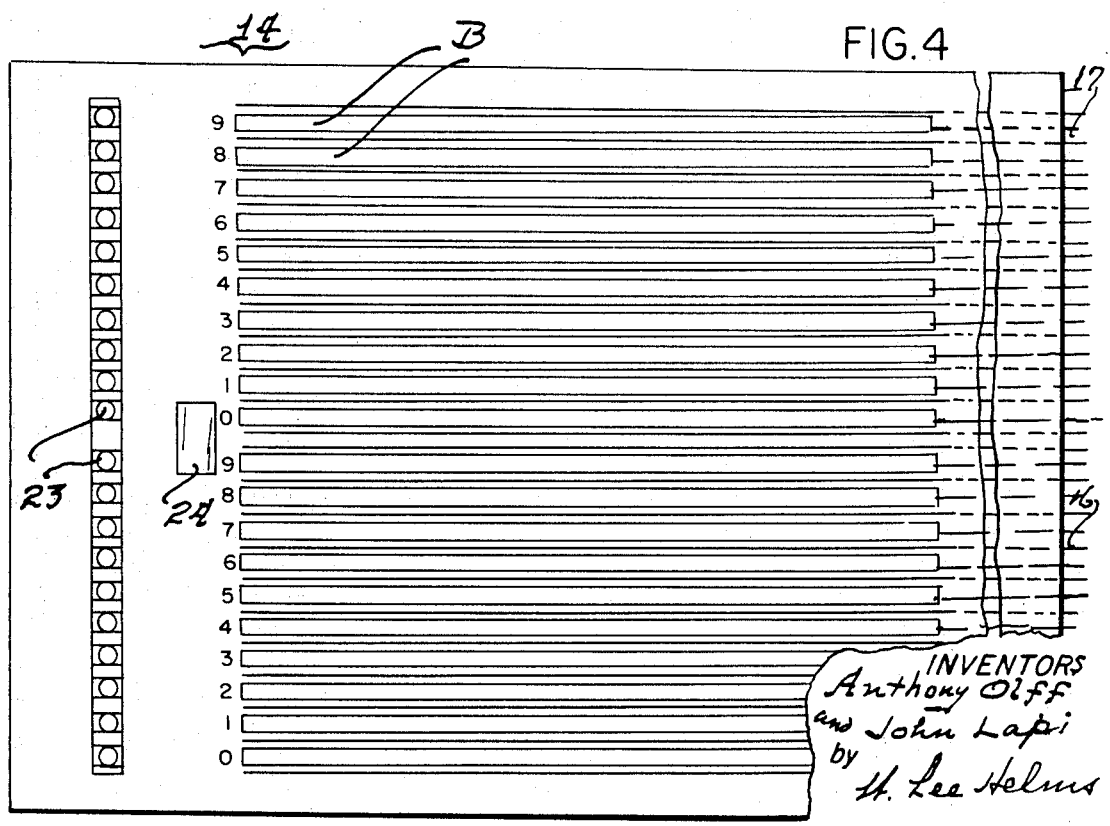
FIG. 4 is a top plan view of the underlying plate.

Referring to FIG. 4, it will be seen that the lowermost or "underlying" plate 14 is printed with two groups of longitudinally extending circuit leads, which leads correspond with appropriate leads to the numerical tube filament negative contacts. These circuit leads run to the end of plate 14 and to projecting contact pins indicated at 16, 17.

The overlying plate 12 is printed with two spaced row groups of circuit leads running transversely of those on the underlying plate 14. Each of said transversely extending circuit leads on overlying plate 12 will be connected to one of a plurality of projecting contact pins 18 and 19 of strips A, FIG. 4 at the end of said plate.

Figure 3:
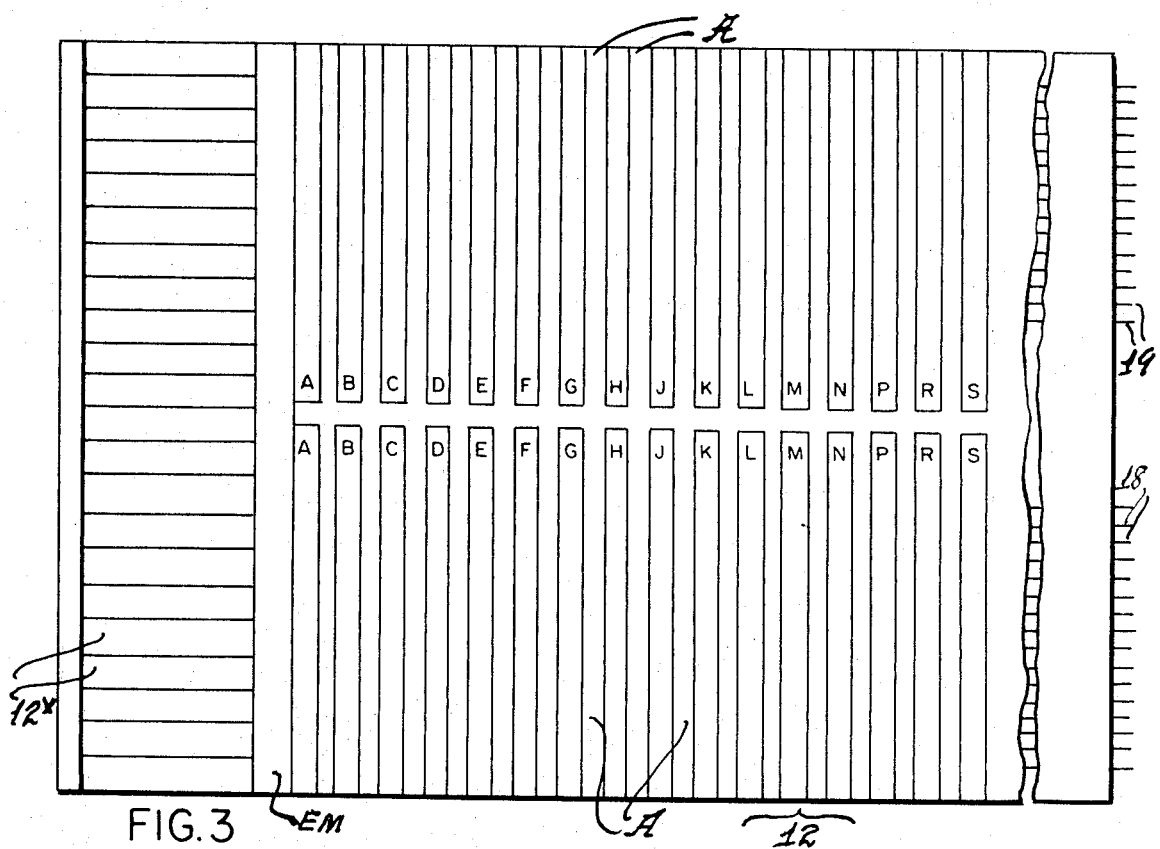
FIG. 3 is a bottom view of the overlying plate showing two spaced transverse rows of current leads omitting six additional like leads in each row, normally used in the embodiment, shown in the wiring diagram of FIG. 6.

Referring to the diagrams of FIGS. 3 and 4, the strip electrical leads indicated at A, of the upper plate 12, are non-grounded. The strip electrical leads of the lower plate 14, indicated at B, also are non-grounded. The projecting lead pins 17 of the lower plate will be connected to the lead pins 18 and 19 of the upper plate. However, adjacent to each of each of the strips B of the lower plate, but sufficiently out of contact therewith, is a grounding wire lead $B^x$, FIG. 4, and of course each of said wire leads will be led to a ground. The steel ball referred to above, in its circuit closing action will make contact with both the strip and its appropriate ground wire lead, by deposit intermediate the latter and the strip, and of course the ground wire, in each case, may be held slightly raised relatively to the strip, as well as slightly laterally spaced therefrom.

Figure 6:
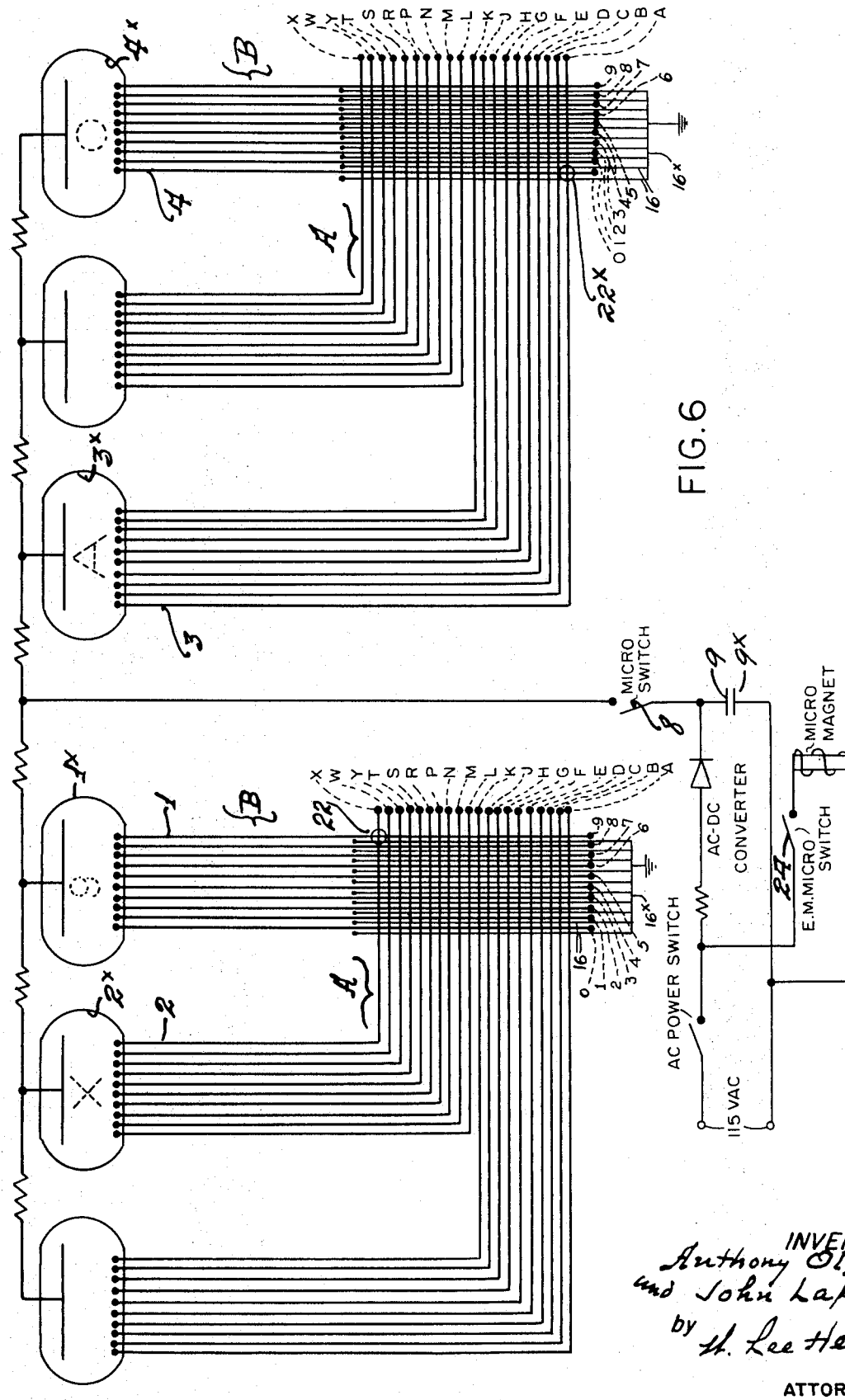
FIG. 6 is a wiring diagram.

Referring to FIG. 6, it will be seen that in the embodiment illustrated that with respect to the six lamps each lamp carries ten filaments, and therefore the group of three lamps carries thirty leads each connected to a filament which in this case is on the negative side. The plate of each lamp receives the positive charge and each lamp is a multi-contact and multi-filament "bulb," known as a "Nixie Tube," as supplied for example by the Electronics Division of Burroughs Corporation. Four of the "Nixie Tubes" are indicated at $1^x$, $2^x$, $3^x$ and $4^x$. A desired relation of the leads on the two plates is shown in FIGS. 3 and 4 and the relation of the leads shown in FIG. 6 is the same in principle. In other words the leads at A extend in a direction crossing the leads B, and when any one of the leads of group A is brought into contact with one of the crossing leads B, flow of electrical power is brought through the appropriate lamp filament, as indicated by FIG. 6, considered with FIG. 4. A steel ball, carried in a predetermined punched opening in the credit card, will contact filament leads 1 and 2 via the strip 9 of the upper plate and the appropriate strip of the lower plate together with the ground wire adjacent the lower plate strip. This reference is made to the left side of FIG. 6 where the steel ball is indicated at 22. Also, as shown at the right side of FIG. 6, a second steel ball $22^x$ in a predetermined punched opening of the credit card will contact filament leads 3 and 4 via the appropriate lower strip and its adjacent ground wire, causing illumination of the filament symbols O and A. Thus, depending on the positions of the punched holes, many visual code ordinates are possible with the device.

Figure 5:
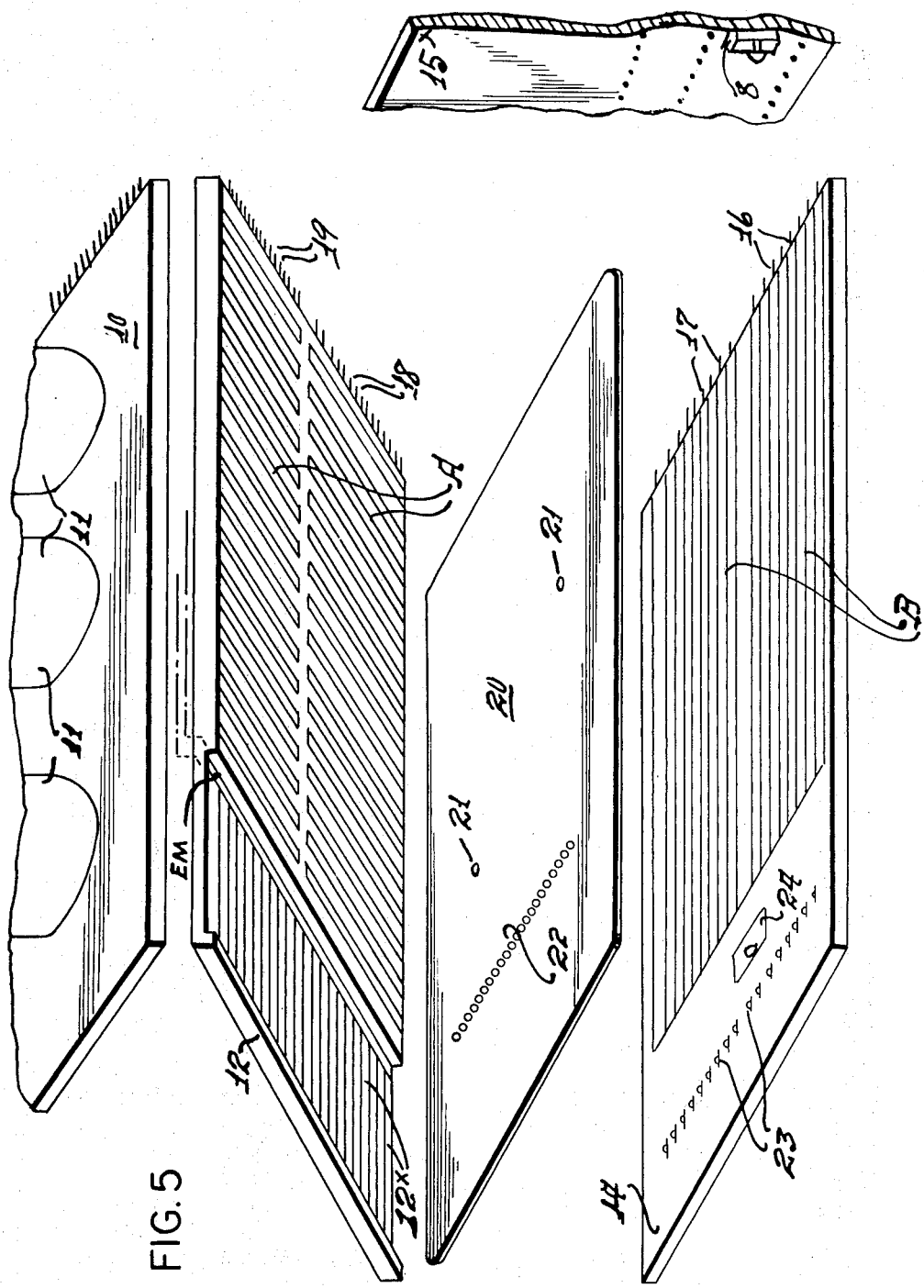
FIG. 5 is a perspective view showing, separated, the plates with a punched card between them, and conductor pins at the ends of the plates, also indicating an anode voltage control microswitch which is engaged by the card, a lamp holding plate, and an AC-DC converter plate.

In FIG. 6 the power supply is shown as including an AC—DC converter with multiple taps, to provide the DC voltage necessary for the operation of the "Nixie Tubes," a circuit for an electromagnetic element, shown at EM in FIGS. 2 and 5, and for the circuits in general. The power supply is controlled by a main AC power switch to card-operated microswitches 24 and 8 and the two steel balls. The lead indicators 9, 9$^X$, may be considered as representing any crossed negative pair of the printed leads of groups A and B, to be closed by a steel ball in the operation of the device by the punched card. Normally, closing of the power switch will, through suitable connections well known to those skilled in the art, place the leads to the overlying lamp filaments in the negative side of the circuit, the circuit through any given lead of the underlying plate 14 being completed by a ball carried by the credit card 20 and by the flow of current through the appropriate ground wire or wires B$^X$ of FIG. 4. These ground wires 16 may be all connected to a suitable ground medium, shown at 16$^X$. It will be understood that the ball will not only contact with the appropriate lead B but will bridge over on one of the adjacent ground leads B$^X$ of FIG. 4.

It will be seen that the groups of printed circuit leads on the two plates 12 and 14, cross each other. Each separate lead will be independently connected to its contact pin, groups of the pins being diagrammatically indicated in FIG. 5 at 16, 17, 18 and 19. These pins may pass through holes in a back board 15$^X$ of the holding box, and each pin will be connected to its appropriate ground connection as shown by the numerals 0 to 9 and letters A to X, FIG. 6. As indicated by the right hand board element 15$^X$ of FIG. 6 the board will receive an additional row of holes to receive electrical pins each leading to an appropriate filament ground lead of a predetermined "Nixie Tube."

In FIGS. 2 and 5, the card is indicated at 20, its punched out holes at 21, and for a purpose of description a row of steel balls on the card is indicated at 22.

Forwardly of the two groups of printed circuit leads 18 and 19 on plate 12, FIG. 5, are a plurality of guide channels at 12$^X$, a wall of one guide channel being shown at FIG. 2. Each guide channel receives a steel ball. In the underlying plate 14 (which will be supported in the box along with the card and the overlying plate at a downwardly extending angle indicated by the dotted line X of FIG. 2), is a row of spring pressed ejector members 23, FIGS. 5 and 2, and forwardly thereof is a microswitch element 24 for a purpose hereinafter specified. Extending from side to side of the upper plate 12, and facing downward, is an electromagnet strip, EM, diagrammatically shown in FIG. 6 and as indicated in FIGS. 2 and 3.

The operation of the device is as follows

When the power switch is closed, referring to Fig. 6, and a card is inserted, the row of steel balls will have been drawn upwardly and held by the magnet strip EM. When the front edge of the card strikes the microswitch 24, the circuit through the magnet strip will be broken and the balls will drop on top of the card, but the shoulder at the rear of each ball guiding channel 12$^X$ is sufficient to prevent the balls from moving forwardly. However, when the card is moved to a position where the first punched hole therein comes into register with an alined ball, the latter will drop into the hole of the card, and the second hole will cause dropping of the second ball therein. The card will then be moved to final position, each ball having been brought into contact with appropriate circuit predetermined negative leads of group A and group B carried by the plates 12 and 14. The final inward movement of the card will close the circuit by operation of microswitch 8 (FIGS. 3 and 6), and by means of the pins and leads therefrom, circuit connections will be made from appropriate filament contacts of the "Nixie Tubes." Thus referring to FIG. 6 with reference to FIG. 2, it will be seen that the first and second balls have closed contacts leading to four "Nixie Tubes" which will display the symbols X, 9 and A, 0.

From the above it appears that the microswitch 24 is normally closed when the power switch is closed, but it is of such character as to be opened by the card when the front end thereof is pushed to a point where it underlies the row of balls; that before a card is pushed between the two plates, the magnet strip EM holds the balls suspended above the card and then is de-energized by microswitch 24. In the withdrawal of the card carrying the two balls, the latter being of very small diameter and lightweight, the two balls will come into register with the spring ejectors 23, FIG. 2 and FIG. 4, the latter having been depressed by the inward movement of the card. Two of the ejectors will push the two balls upward to the top surface of the card, and because the assembly is tilted at a downward angle (as shown by the dotted line in FIG. 2), the two balls will roll downward, to be held by the magnet strip EM at the instant the end of the card passes the electromagnet microswitch 24. The device is then ready to receive the next card to be decoded.

It will be understood that various modifications in the form and arrangement of the elements of the embodiment illustrated may be made within the spirit of the invention.

Having described our invention, what we claim and desire to secure by Letters Patent, is as follows:

1. An electrical device for visually checking credit cards, comprising at least two multi-filament electric tubes adapted to be selectively energized as to each filament and thereby producing a visual letter or symbol, and electrical circuits having a plurality of leads each connected to one of the filaments, a holding member, two separated plates in the holding member, each plate carrying at least one row of circuit leads and each of a normally broken lead being in said circuit leading to a ground contact of one of said filaments, the rows of leads on one plate being in crossed relation to the leads on the second plate and normally breaking the circuit, a card having at least two holes punched therethrough, a plurality of movable conductor elements in the holder and normally above the card, whereby movement of the card will bring its holes each into register with one conductor element lying above the card and whereby the conductor element will enter the hole and additional movement of the card will bring the conductor elements selectively each into contact with one negative lead carried by the first plate and a negative lead carried by the second plate at intersections of said lead, and circuit closing means adapted to be closed by the card on a final movement thereof between the two plates.

2. An electrical device for visually checking credit cards, constructed in accordance with claim 1 in which the conductor elements are in the form of balls, magnetic means for normally holding the balls above a lowermost one of the two separated plates, said magnetic means being energized by connection with the electrical circuit, and electrical switch means operable by the card in its passage between the plates for breaking the circuit to said magnetic means.

3. An electrical device for visually checking credit cards, constructed in accordance with claim 1, in combination with means for ejecting balls from holes in the card in the withdrawal of the latter from the holding member.

4. An electrical device for visually checking credit cards, constructed in accordance with claim 1 in which the holding member and the two plates supported thereby, are normally downwardly inclined from the horizontal, one of the two plates forwardly of its electrical leads being provided with side-by-side longitudinally directed channels, one channel for each movable conductor element, in combination with means carried by the device and adapted to eject movable conductor elements from holes punched in the card during withdrawal of the latter from the holding member.

5. An electrical device for visually checking credit cards, constructed in accordance with claim 1 in which each of the plates carries two rows of circuit leads, the rows of leads on one plate extending transversely of the leads of the second plate and intersecting the latter, but normally spaced therefrom, the movable conductor elements in the two holes of the cards being relatively spaced and adapted to connect one lead of each group of leads on the first of said plates with one lead of each group of the leads on the second of said plates when the card is moved between the plates to a predetermined position, the said leads from the plates thus brought into closed circuit relationship being connected to ground contacts of the filaments of at least four multi-filament electric tubes.

6. An electrical device for visually checking credit cards, constructed in accordance with claim 1 in which area of the device forwardly of a lowermost one of the two plates is provided with a transverse row of ejector elements operable when the card is moved rearwardly to bring its punched holes in register therewith to eject the conductor elements from said holes, the device as a whole being inclined downwardly so that the ejected conductor elements move rearwardly over the card, the second and uppermost of the two plates having a row of guide channels, one for each conductor element, said channels ending in shoulder-stop means for the conductor elements; magnetic means in the circuit adjacent said shoulder stop means for magnetically holding the ejected balls, and means for energizing said magnet means and adapted to be operated upon withdrawal of a card therefrom.

7. An electrical device for visually checking credit cards, constructed in accordance with claim 1 in which the multifilament electric tubes are carried by a board-like member provided with leads from the ground contacts of the filaments of each tube terminating in conductor pins, and each plate at its end is provided with conductor pins, each connected to one lead of an appropriate plate, and a board-like member at the end of the holding member and provided with three rows of holes which receive said conductor pins for selective connection to complete the circuit to be closed by action of the card and the conductor elements carried thereby.

References Cited
UNITED STATES PATENTS

| | | | |
|---|---|---|---|
| 2,769,939 | 11/1956 | Williams | 340—343 |
| 3,148,251 | 9/1964 | Burke | 235—61.11 |
| 3,323,121 | 5/1967 | Burton et al. | 340—149 X |

MAYNARD R. WILBUR, Primary Examiner

T. J. SLOYAN, Assistant Examiner

U.S. Cl. X.R.

200—46; 340—149, 166